(12) United States Patent
Wilczek (10) Patent No.: US 10,664,802 B1
(45) Date of Patent: May 26, 2020

(54) AUTOMATICALLY GENERATING INVOICES FROM CONTRACTS IN A PROCUREMENT SYSTEM

(71) Applicant: Coupa Software Incorporated, San Mateo, CA (US)

(72) Inventor: Donna Wilczek, San Mateo, CA (US)

(73) Assignee: COUPA SOFTWARE INCORPORATED, San Mateo, CA (US)

( * ) Notice: Subject to any disclaimer, the term of this patent is extended or adjusted under 35 U.S.C. 154(b) by 581 days.

(21) Appl. No.: 15/589,984

(22) Filed: May 8, 2017

Related U.S. Application Data (60) Provisional application No. 62/333,746, filed on May 9, 2016.

(51) Int. Cl.
*G06Q 10/10* (2012.01)
*G06Q 50/00* (2012.01)
*G06Q 10/08* (2012.01)

(52) U.S. Cl.
CPC .......... *G06Q 10/10* (2013.01); *G06Q 10/083* (2013.01); *G06Q 10/107* (2013.01); *G06Q 50/01* (2013.01)

(58) Field of Classification Search
None
See application file for complete search history.

(56) References Cited

U.S. PATENT DOCUMENTS 5,692,206 A   11/1997  Shirley
8,694,429 B1*  4/2014  Ballaro .............. G06Q 30/0601
                                                        705/40

(Continued)

OTHER PUBLICATIONS

Paystream Advisors, Electronic Invoice Management, A move to the middle; (Year: 2014).*

*Primary Examiner* — Dennis W Ruhl
(74) *Attorney, Agent, or Firm* — Hickman Palermo Becker Bingham LLP (57) ABSTRACT

An improved procurement system and method are provided. The improved procurement system comprises: a memory having stored therein an account of a first entity, the account associated with a first computer and comprising contract data associated with a first entity and a contract terms included in a contract between the first entity and a second entity, wherein the second entity is not associated with the account; one or more processors; a non-transitory machine-readable medium having instructions stored thereon, the instructions executable by the one or more processors to perform: generating a Contract Order Document from the contract data associated with the first computer, the Contract Order Document being an electronic document comprising a portion of the contract data and a selectable user interface element that, when selected by a second computer associated with the second entity, generates an instruction to generate a first document; sending, via a network, the Contract Order Document to the second computer; receiving, in response to the Contract Order Document, the instruction from the second computer to generate the first document; obtaining, in response to the instruction and from the account of the first computer, at least a portion of the contract terms included in the contract between the first entity and the second entity; generating the first document using the at least the portion of the contract terms obtained from the account of the first computer; sending, via a network, the first document to the second computer.

20 Claims, 6 Drawing Sheets

(56) References Cited

U.S. PATENT DOCUMENTS

| | | | |
|---|---|---|---|
| 10,410,274 B1* | 9/2019 | McEneny, Sr. | G06Q 30/04 |
| 2005/0096967 A1 | 5/2005 | Gerrits | |
| 2007/0225986 A1 | 9/2007 | Bowe | |
| 2007/0265962 A1* | 11/2007 | Bowe, Jr. | G06Q 20/102 |
| | | | 705/40 |
| 2009/0018889 A1 | 1/2009 | Petersen | |
| 2011/0258083 A1* | 10/2011 | Ren | G06Q 10/087 |
| | | | 705/27.1 |
| 2014/0129377 A1* | 5/2014 | Nakabayashi | G06Q 30/04 |
| | | | 705/26.8 |
| 2016/0098779 A1* | 4/2016 | Wilczek | G06Q 30/04 |
| | | | 705/26.8 |

* cited by examiner

FIG. 1

202 → YOUR ACCOUNT | CART (0) | MENU

CONTRACT MANAGEMENT

204

Lorem ipsum dolor sit amet, consectetur adipiscing elit. Vivamus eu egestas diam. Etiam sagittis ut velit maximus viverra. Sed euismod massa nisl, a laoreet risus aliquet quis. Nunc vel eros rutrum, molestie leo nec, fermentum felis.

Nunc pretium magna a mauris dapibus pulvinar. Curabitur ultrices pharetra diam, eu elementum velit.

Aenean dolor orci, tristique sit amet lectus sed, imperdiet posuere purus.

Sed gravida ornare quam, a consequat sapien vehicula ac. In velit quam, blandit non pulvinar sed, consectetur vitae justo. Sed sit amet tellus interdum, finibus sapien eu, pharetra ligula.

1. TERM
Donec at nibh in risus viverra aliquam eu dapibus mi. Quisque sit amet convallis arcu. Vivamus sit amet risus ut felis maximus faucibus.

2. PRICE
Quisque congue lectus ut augue tincidunt, auctor porttitor est varius. Aliquam at felis diam. Nam sit amet quam non massa finibus fermentum. Sed nec posuere libero. Maecenas ut lectus ante. Nulla ac aliquet orci. Sed vel diam pellentesque, euismod diam nec, sagittis erat. Proin sed augue nec felis ultrices luctus.

3. PAYMENT SCHEDULE
Lorem ipsum dolor sit amet, consectetur adipiscing elit. Morbi dapibus justo ut ex aliquet mattis luctus nec nisl. In quis pretium quam. Nunc eu est vel odio maximus molestie nec ut sapien. Maecenas at risus magna. Curabitur congue consectetur venenatis. Vestibulum maximus rutrum dui vel aliquet. Suspendisse faucibus commodo lorem vitae maximus.

_________________          _________________
SUPPLIER                              PURCHASER

[ SEND INVOICABLE DOCUMENT TO SUPPLIER ]

FROM: PURCHASER@COMPANY.COM
TO: SUPPLIER@SUPPLY.COM      _304_

RE: CONTRACT APPROVED, CREATE TIMESHEET      _306_
MAY 11, 2016 10:19

_302_      _308_ ( ADD CONTRACT COMMENT )      _310_ ( CREATE TIMESHEET )

| TIME APPROVER: | | |
|---|---|---|
| MR. PURCHASER | FROM MAY 1, 2016 | HOURS 120 HRS |
| CEO | TO MAY 1, 2017 | RATE 90.00 USD/HR |
| COMPANY | | _312_ |

_314_

Lorem ipsum dolor sit amet, consectetur adipiscing elit. Vivamus eu egestas diam. Etiam sagittis ut velit maximus viverra. Sed euismod massa nisl, a laoreet risus aliquet quis. Nunc vel eros rutrum, molestie leo nec, fermentum felis.

Nunc pretium magna a mauris dapibus pulvinar. Curabitur ultrices pharetra diam, eu elementum velit.

Aenean dolor orci, tristique sit amet lectus sed, imperdiet posuere purus.

Sed gravida ornare quam, a consequat sapien vehicula ac. In velit quam, blandit non pulvinar sed, consectetur vitae justo. Sed sit amet tellus interdum, finibus sapien eu, pharetra ligula.
1. TERM
Donec at nibh in risus viverra aliquam eu dapibus mi. Quisque sit amet convallis arcu. Vivamus sit amet risus ut felis maximus faucibus.
2. PRICE
Quisque congue lectus ut augue tincidunt, auctor porttitor est varius. Aliquam at felis diam. Nam sit amet quam non massa finibus fermentum. Sed nec posuere libero. Maecenas ut lectus ante. Nulla ac aliquet orci. Sed vel diam pellentesque, euismod diam nec, sagittis erat. Proin sed augue nec felis ultrices luctus.

FIG. 3

| ANNUAL TIMESHEET 400 | | | |
|---|---|---|---|
| SUPPLIER 402 | | | |
| 120 HRS @ 90.00 USD/HR 404 | | | |
| DESCRIPTION: PROVIDE SECURITY SERVICES 406 | | | |
| DATE 408 | HOURS 410 | RATE 412 $90/HR | AMOUNT DUE 414 |
| | | | |

AUTOMATICALLY GENERATING INVOICES FROM CONTRACTS IN A PROCUREMENT SYSTEM

BENEFIT CLAIM

This application claims the benefit of provisional application 62/333,746, filed May 9, 2016, the entire contents of which are hereby incorporated by reference for all purposes as if fully set forth herein, under 35 U.S.C. § 119(e).

FIELD OF THE DISCLOSURE

The technical field of the present disclosure is automatic data processing in computer-implemented procurement systems. A more specific technical field is computer systems that are programmed to automatically create a second type of electronic document based in part upon a first type of electronic document as well as programmed rules.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In procurement, a contract is agreed to by two or more parties dictating the terms of a relationship between the parties. The terms include information such as time, materials, milestone payments, and payment terms. A buyer generates a purchase requisition, and the purchase requisition is then used to generate a purchase order. The purchase order is sent to the supplier for invoicing. Generating the purchase requisition and the purchase order is, however, a redundant and expensive process for many companies.

Further, an entity may have a large number of complex contracts with different entities, including consulting agreements, service agreements, and the like. The different entities may not have a sophisticated system for contract management or invoicing and are therefore more prone to making errors when submitting invoices to the entity. The errors may cause the entity to delay payment on the contract.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

The detailed description below is organized accordingly:
1. GENERAL OVERVIEW
2. EXAMPLE DATA PROCESSING SYSTEM
3. EXAMPLE USER INTERFACES
4. EXAMPLE PROGRAMMED METHOD
5. IMPLEMENTATION EXAMPLE—HARDWARE OVERVIEW

1. GENERAL OVERVIEW

An improved procurement system for generating and submitting invoices is described, with the programmed capability of generating a second type of electronic document based upon a first time. In one embodiment, a purchaser computer, which is associated with a purchaser entity that is purchasing goods or services from a supplier entity, provides a contract having one or more contract terms to a contract management computer via a networked communication link such as via the internet. The contract is provided in digital electronic form, as an electronic document, structured text, structured markup file, and so forth. The contract document alone normally is not capable of direct use in the procurement system for generating a purchase order or payment.

The contract management computer is programmed to identify contract data from the contract terms. The contract data includes terms associated to the goods or services exchanged and one or more terms of payment for the goods and services. The contract data may include, but is not limited to, correspondence information of the entities, delivery information, unit price, hourly rates, retainer amounts, per diem amounts, number of units, number of hours, payment terms, penalties, time frames, due dates, milestones, and milestone payments. The contract data is stored in association with an account of the purchaser computer at the contract management computer.

A contract management computer, having access to stored contracts associated with the purchaser computer via a network such as the internet, is programmed to generate a Contract Order Document from terms included in the contract. The Contract Order Document is an electronic form or stored digital data that allows a supplier computer, which is associated with the supplier entity, to create one or more supplier documents using the procurement system and without logging into an account at the contract management computer. The Contract Order Document may be sent to the supplier via email and have one or more buttons that, when selected by the supplier computer, instruct the contract management computer to generate a supplier document.

The contract management computer, upon receiving instructions to create a supplier document from the supplier computer, accesses contract data associated with the purchaser computer stored at the contract management computer. The supplier computer does not have permission to access the contract data stored at the contract management computer. The contract management computer generates and sends the supplier documents to the supplier computer. The supplier computer may modify the supplier documents and submit the supplier documents to the purchaser computer. These transactions and communications occur electronically via networked links using facilities such as the internet.

The improved procurement system may provide technological advantages over current procurement systems. The improved procurement system reduces memory, network bandwidth, and other computing resources that would be used by a redundant system. The improved procurement system further reduces the likelihood of inconsistencies between procurement systems. The system also addresses a problem unique to or centered on the internet, namely how to arrange cooperation of distributed computer systems in which one system holds a digital document such as the contract that is not directly usable in another system to generate another kind of electronic document such as a purchase order or a set of payment instructions. This problem exists only because the internet has made it possible for widely geographically separated computers to communicate, transfer or exchange different kinds of electronic documents that have been independently and locally stored, and have a relationship to a larger transaction, but are not directly usable in one of the other computers.

2. EXAMPLE DATA PROCESSING SYSTEM

Figure 1:
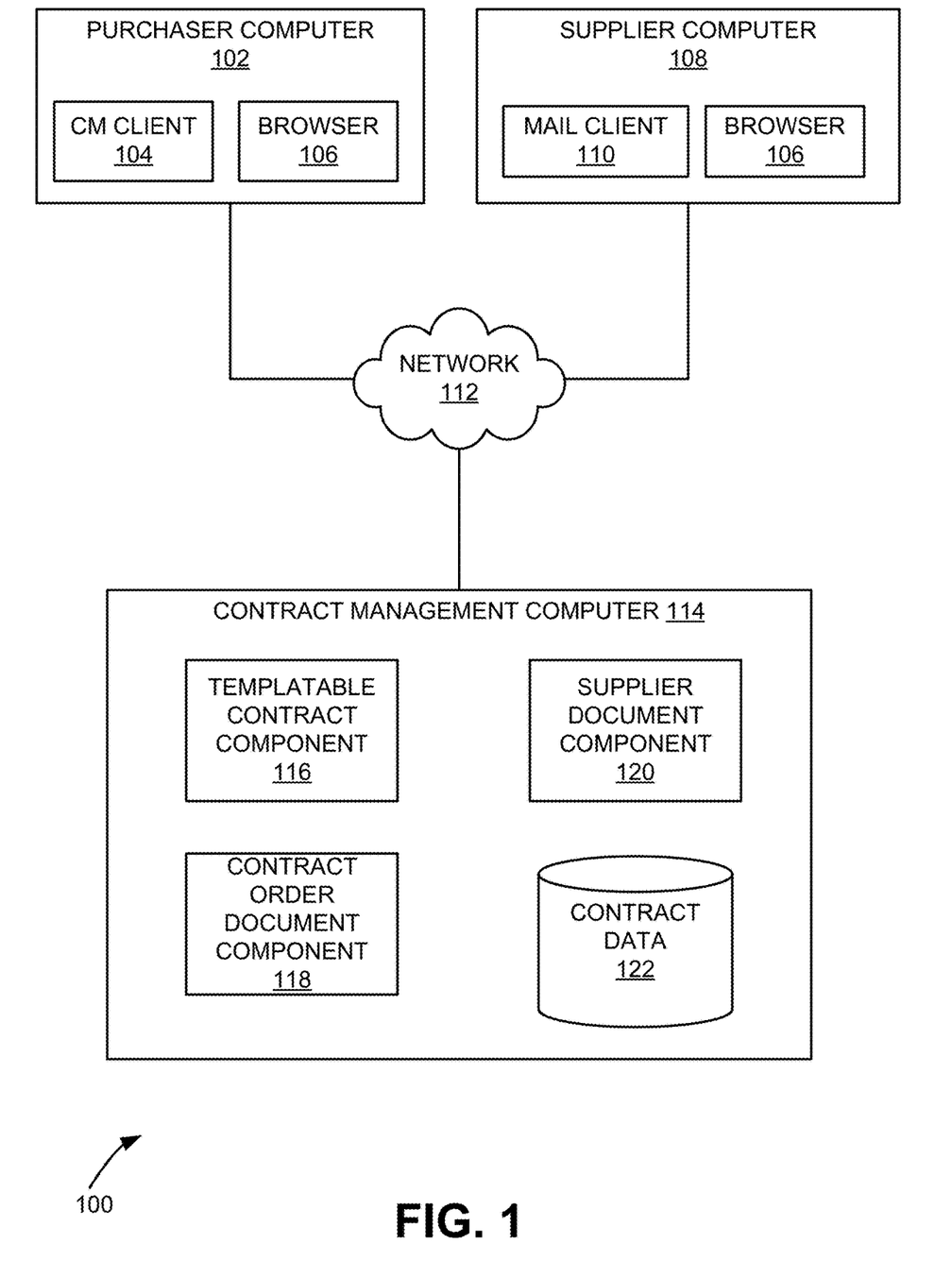
FIG. 1 is a block diagram of a computer networking environment in which various embodiments may be practiced.

FIG. 1 is a block diagram of a computer networking environment 100 in which various embodiments may be practiced.

The computer networking environment 100 comprises a purchaser computer 102, a supplier computer 108, and a contract manager computer 114, which are communicatively coupled to one another via a network 112. The computer networking environment may comprise additional instances of the purchaser computer 102 and/or the supplier computer 108. The network 112 broadly represents any combination of one or more of a local area network (LAN), Wide Area Network (WAN), an internetwork such as the public internet, or other communications network. Instructions between the purchaser computer 108, the supplier computer 108, and the contract manager computer 114 may be communicated using one or more secure messaging protocols, such as HTPPS.

The purchaser computer 102 may be a smartphone, tablet, laptop, or desktop computer that is associated with a purchaser entity. The purchaser computer 102 may be assigned to a contract management or purchasing department within the purchaser entity. The purchaser computer 102 has an account with the contract management computer 114.

In one embodiment, the purchaser computer 102 may access the account using a contract management (CM) client 104. The CM client 104 is a client application that is dedicated to providing an interface for interactions with the contract management computer 114. The CM client 104 includes log-in functionality that allows the purchaser computer 103 to log in to an account at the contract management computer 114. The CM client 104 may store at least some of the contract data associated with the purchaser computer 102. The CM client 104 may further allow the purchaser computer 102 to set permissions, and to add, delete, or modify the contract data.

The purchaser computer 102 may comprise a browser 106. The browser 106 is an online web browser. Using a web application, the purchaser computer 102 may perform at least some of the tasks described in association with the CM client 104. In some embodiments, the CM client 104 may be omitted and the browser 106 may be the means of accessing the contract management computer 114.

The supplier computer 108 may be a smartphone, tablet, laptop, or desktop computer associated with a purchaser entity. The supplier computer 108 may be assigned to an accounts receivable or bookkeeping department within the supplier entity. The supplier computer 108 does not have an account with the contract management computer 114. Outside of contracts with the purchaser entity and as described herein, the supplier entity has no account or relationship with the contract management computer 114. The supplier computer 108 does not have permission to access the contract data or to modify the contract data stored at the contract management computer 114.

An email client 110 installed on the supplier computer 108 comprises programmed instructions to receive and send emails on behalf of the user. The email client 110 may be web-based or may be dedicated a software application that is separate from the browser 106. The email client may receive email messages that include Contract Order Documents and supplier documents or have such documents attached. The email messages may include details about the contract, contract data, and instructions to obtain supplier documents. The email client 110 may be, for example, the MAIL app using the APPLE IOS operating system, MICROSOFT OUTLOOK, or OPEN MAIL.

Figure 3:
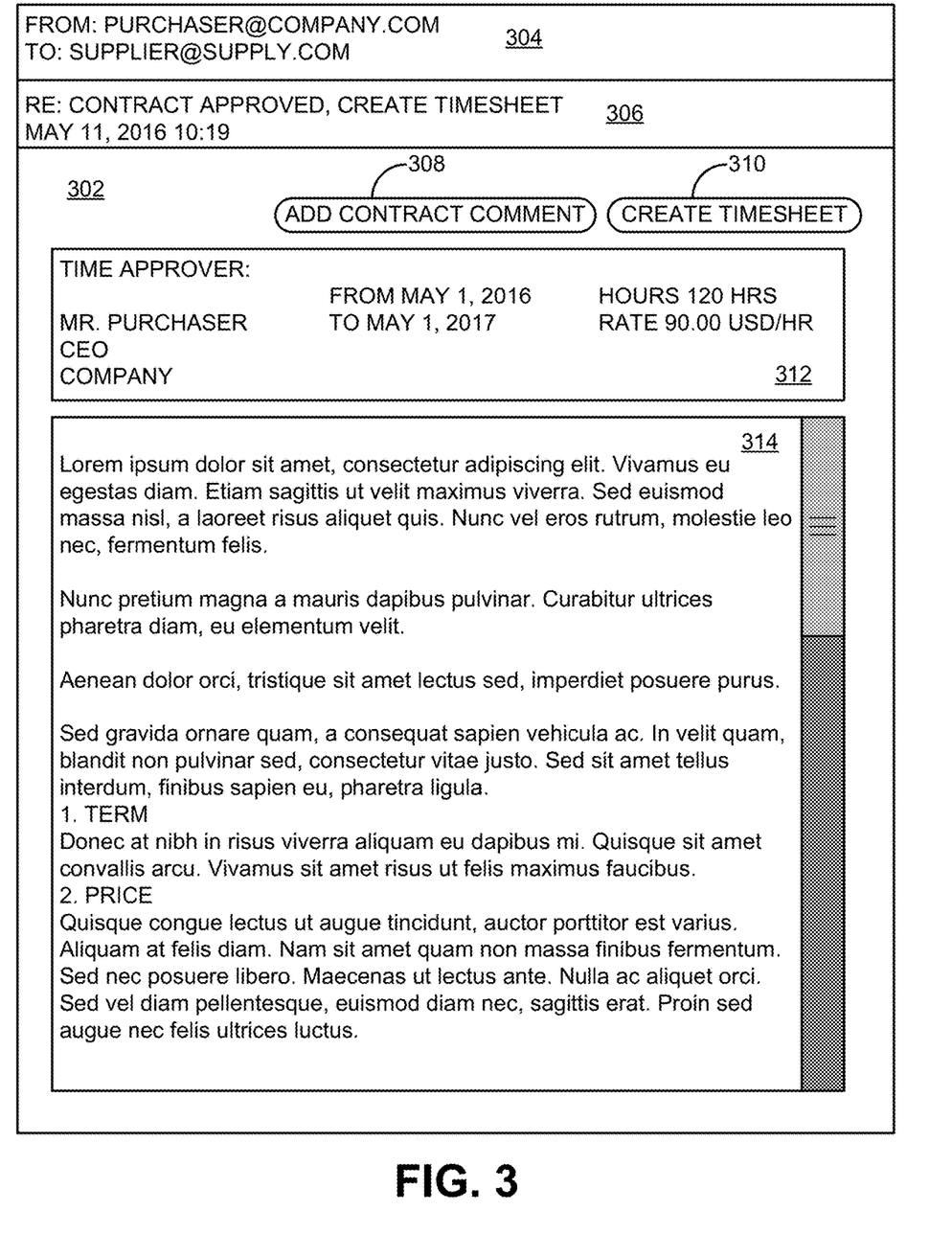
FIG. 3 depicts a portion of a second user interface comprising a Contract Order Document, in one embodiment.

Contract Order Documents are digital electronic documents that may be sent from the contract management computer 114 to the supplier computer 108 on behalf of the purchaser computer 102. In an embodiment, Contract Order Documents include contract data and one or more option values or configuration instructions to instruct the contract management computer 114 to generate supplier documents. The Contract Order Document may be formatted as an email, a webpage, or another electronic document that is capable of carrying or supporting the options or configuration instructions. In some instances, the Contract Order Document may be an HTML5 document, an XML document, or other structured digital electronic document. An example Contract Order Document is illustrated in FIG. 3 and further described in other sections herein.

Supplier documents are sets of stored digital data or electronic documents that are typically sent from a supplier computer 108 to the purchaser computer 102. Supplier documents include, but are not limited to, invoices, timesheets, shipment notifications, and receipts. The supplier documents that can be generated depend on, for example, the terms of the contract between the purchaser entity and the supplier entity.

The supplier computer 108 may further include browser 106 and may use the browser to access a web-based email application or a webpage that is generated by the contract management computer 114 from which the supplier computer 108 may access the Contract Order Document. The supplier computer 108 may access the Contract Order Document without logging in to the contract management computer 114 via, for example, a secure link provided via email to the supplier computer 108. The secure link may incorporate a nonce, key or other authentication code that is not capable of easy duplication or falsification.

In an embodiment, the contract management computer 114 is a computer associated with a contract management technology provider, such as Coupa Software Incorporated of San Mateo, Calif. The contract management computer 114 provides functionalities associated with contracts and contract management for various entities. The contract management computer 114 may provide both purchaser-side and supplier-side services for any given entity.

In the embodiments described herein, the contract management computer 114 maintains one or more accounts for the purchaser computer 102. The accounts may each be associated with one or more contracts entered into by the purchaser entity with one or more supplier entities. The purchaser computer 102 accesses its account(s) by logging in to the contract management computer using, for example, a username-password login, two factor authentication, a saved login cookie or security token, or another log in technology.

A templatable contract component 116 within the contract management computer 114 generates, or is used by the purchaser computer 102 to generate, a contract comprising one or more terms. The contract may be a form having one or more fillable fields associated with the terms of the contract. The fillable fields may be auto-filled using data stored in a profile associated with the account of the purchaser computer 102 or may be filled manually by a user of the purchaser computer 102 using a keyboard, mouse, touchscreen, or other input device. The fillable fields may include numerical fields, text fields, drop-down menus, and other user interface elements suitable for use with fillable fields. Templatable contract components 116 may be commercially available as part of contract management software solutions.

The templatable contract component 116 is programmed to analyze the information provided in the fields of the contract, and to output contract data that is stored in a database such as contract data 122. Contract data may comprise metadata describing terms of the contract such as products, units, payment terms, currency type, performance dates, and so forth. The contract data may include expected completion dates, payment amounts, a description of the goods or services, payment information, and the like. The contract data may include information about the type of contract or the types of supplier documents that can be generated from the contract. In some embodiments, the terms may be expressed in a structured format such as CSV, as attribute-value pairs, as a calculation having certain inputs, or in another format.

The Contract Order Document component 118 is programmed to generate and send a Contract Order Document to the supplier computer 108. The Contract Order Document component 118 receives an instruction to do so from the purchaser computer 102 according to a default setting associated with the account of the purchaser computer 102 or according to an explicit instruction received from the purchaser computer 102.

The Contract Order Document component 118 is programmed, in response, to access the contract data associated with the contract between the purchaser entity and the supplier entity using the account associated with the purchaser computer 102. The Contract Order Document component 118 may determine one or more types of supplier documents to be generated. For example, a contract for services may be invoiced using a timesheet while a contract for goods may be invoiced using a receipt showing an amount due. The determination may be made from contract data that explicitly states the types of supplier documents to send and, in some instances, a timeline for sending the supplier documents. In some instances, a heuristic model may be used to determine, from the contract data, the types of supplier documents.

The Contract Order Document component is programmed to generate the Contract Order Document with one or more options to generate supplier documents and may include, for example, correspondence information of the purchaser computer 102 or the purchaser entity, a copy of the contract, a portion of the contract data, or the like. The Contract Order Document may be sent via email to the supplier computer 108.

The supplier document component 120 is programmed to generate supplier documents in response to receiving a request or instruction to do so from the supplier computer 108. For example, an API call or parameterized URL query string may be used. The instruction may include a type of supplier document to be generated. In some embodiments, the instruction may include information to be included in one or more fillable fields within a form used to generate a supplier document.

The form used to generate a particular supplier document may be a template, selected by the contract management computer 114 or purchaser computer 102, having one or more fillable fields. The fillable fields in the supplier document may include information such as correspondence information, date, date due, amount due, goods or service provided, and the like. The information included in the fillable fields may be accessed from the contract data 122 associated with the purchaser computer 102. The supplier document component 120 sends the supplier documents to the supplier computer 108 via, for example, email.

The supplier document may be editable by the supplier computer 108. In some instances, the supplier document may be generated such that a portion of the document may not be modified. For example, if the contract includes a per diem amount, the per diem amount may not be changed by the supplier computer 108. The supplier computer 108 may be further restricted from entering a value higher than a threshold based on the contract data. For example, if the contract includes a per diem for no more than ten days, the supplier computer 108 is restricted from entering a number greater than ten into a field for number of days. The supplier computer 108, upon finalizing the supplier document, may send the supplier document to the purchaser computer 102. In some instances, the finalized supplier document may be sent to the contract management computer 114 which then communicates the supplier document to the purchaser computer 102 via, for example, the CM client 104.

3. EXAMPLE USER INTERFACES

Figure 2:
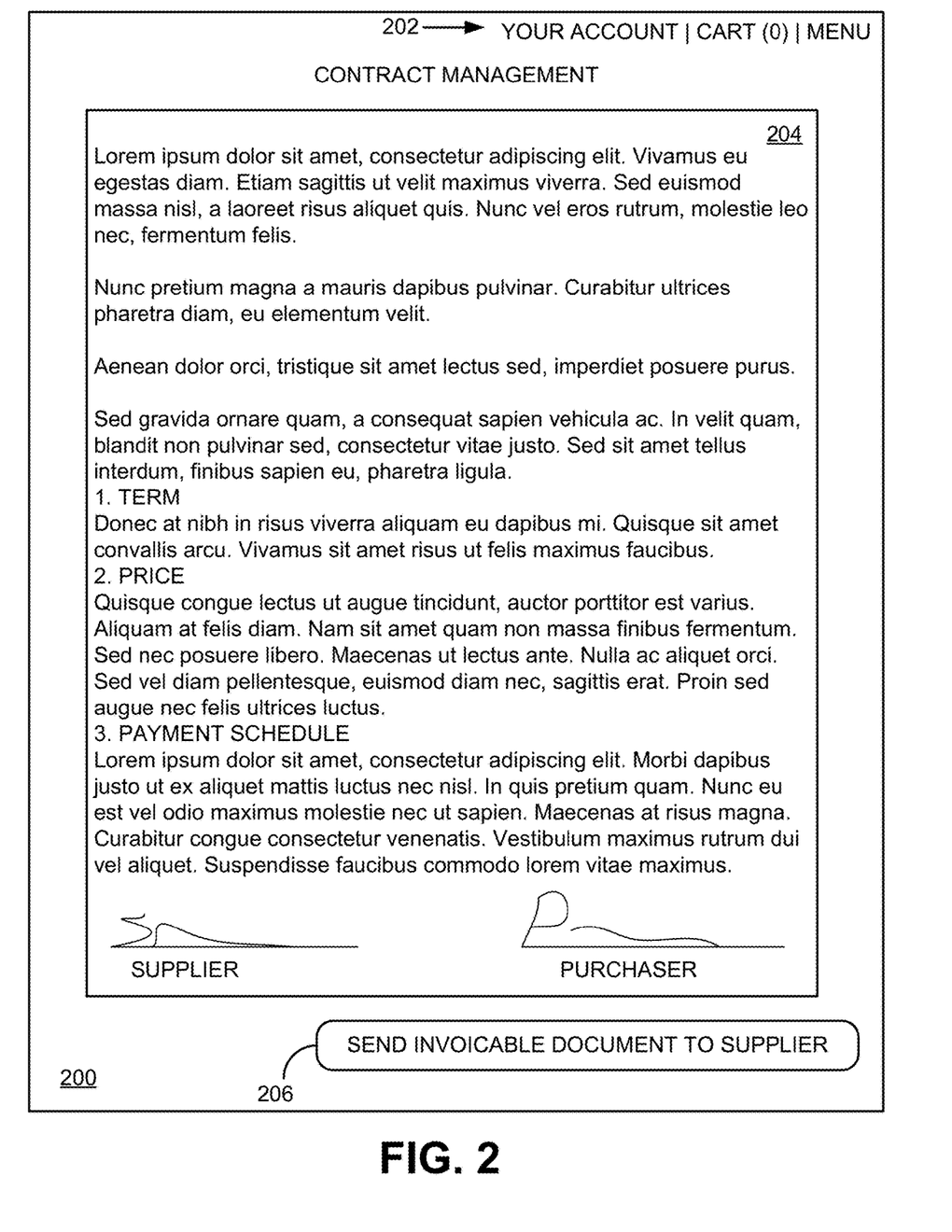
FIG. 2 depicts a portion of a first user interface comprising a contract, in one embodiment.

FIG. 2 illustrates a portion of an example of a first user interface comprising a contract.

The first user interface 200 is generated and presented to the purchaser computer 102 in response to determining that the Contract Order Document is ready to send to the supplier computer 108. The first user interface includes, at user interface elements 202, indications that the purchaser computer 102 is logged into an account at the contract management computer 114, a cart for purchases within the contract management computer 114, and a menu. An electronic copy 204 of the signed contract is optionally included in the first user interface 200. Other embodiments of the user interface 100 may include, for example, contract data, a description of one or more contract terms, or other information about the contract.

The first user interface 200 is programmed with a button 206 that, when selected by the purchaser computer 102, causes the contract management computer 114 to generate a Contract Document Order form to be sent to the supplier computer 108. In other embodiments, the user interface 200 may be programmed with additional buttons from which the purchaser computer 102 may select options to be included in the Contract Order Document.

FIG. 3 illustrates a portion of a second example user interface comprising a Contract Order Document, in one embodiment.

The second user interface may be an email message displayed by the email client 110 of the supplier computer 108. The email message includes correspondence information 304 indicating that this message is sent from an email address, purchaser@company.com, associated with the purchaser computer 102 to an email address, supplier@supply.com, associated with the supplier computer 108. A subject line 306 includes an indication that the contract is approved and that the supplier computer 108 has an action item, to create a time sheet.

A Contract Order Document 302, in this example, includes two selectable buttons 308 and 310, add contract comment and create timesheet. The buttons 308 and 310 may be hyperlinks. The button 308 corresponding to add contract comment, when selected, redirects the supplier computer 108 to a user interface provided by the contract management computer 114 that allows the supplier computer 108 to add a comment to the contract. The button 310, corresponding to create timesheet, when selected, causes an instruction to be sent from the supplier computer 108 to the contract management computer 114 to generate a supplier document of the type "timesheet".

The Contract Order Document 302 further includes a portion 312 of the contract data associated with the contract and stored in contract data 122. The portion 312 identifies a person, Mr. Purchaser, CEO of Company, associated with the contract by the purchaser computer 102. The portion 312 further includes contract data that identifies the time period of the contract, May 1, 2016 to May 1, 2017. The portion also includes the services to be rendered, 120 hours of service, and a rate of $90 per hour. The Contract Order Document 302 includes a copy 314 of the contract.

Figure 4:
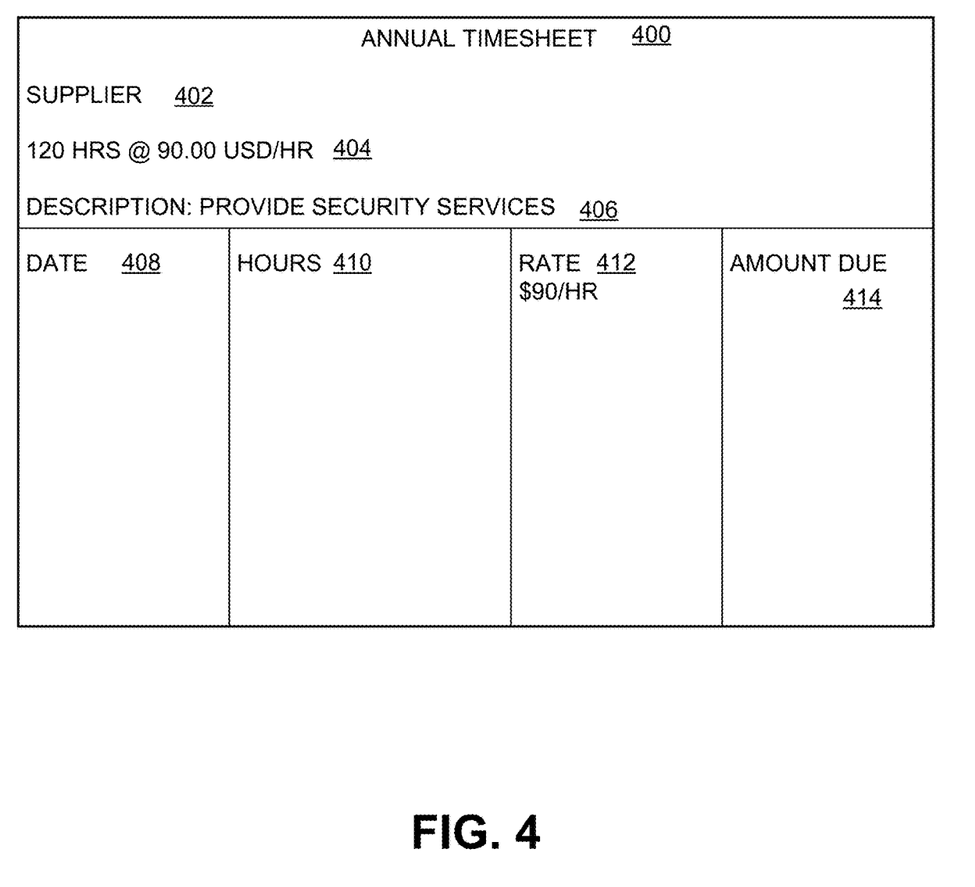
FIG. 4 depicts an example of a supplier document, in one embodiment.

FIG. 4 illustrates an example of a supplier document, in one embodiment.

In the example of FIG. 4, an annual timesheet 400 is shown, which may be generated in response to selection of button 310 in the second user interface. The annual timesheet 400 identifies the supplier at field 402 and includes contract data 404 and 406. Contract data 404 includes 120 hours at $90 per hour, accessed from the contract data 122 via the account associated with the purchaser computer 102. Contract data 406 includes a description of services to be rendered, here, to provide security services. The contract management computer 114 accesses contract data 406 via the account associated with the purchaser computer 102.

The annual timesheet 400 further includes fillable fields 408, 410, 412, and 414. The fillable fields may be filled out by the supplier computer 108 or by the contract management computer 114 according to contract data associated with the contract. The fillable fields 408, 410, 412, and 414 may be pre-filled using inputs received from the supplier computer 108 via the Contract Order Document and/or may be editable by the supplier computer 108.

Fillable field 408 includes a column into which date values may be entered. In some embodiments, the fillable field 408 may be programmed to enforce a restriction that the date value must be between the contract start date and the contract end date. Continuing the example of FIG. 3, the fillable field may reject an input that is not between May 1, 2016 and May 1, 2017. Fillable field 410 includes a column in which a number of hours worked may be entered. Fillable field may be restricted per the contract or to a number of no more than 24 because there are only 24 hours in a day. Further, the sum of the values in fillable field 410 may be restricted to a sum no greater than 120, per the terms of the contract. Fillable field 412 includes an hourly rate. The fillable field 412 may be pre-filled and restricted from further modification. Fillable field 414 includes an amount due. The fillable field may be restricted so that the value does not exceed $10,800, the product of $90/hour and 120 hours.

4. EXAMPLE PROGRAMMED METHOD

Figure 5:
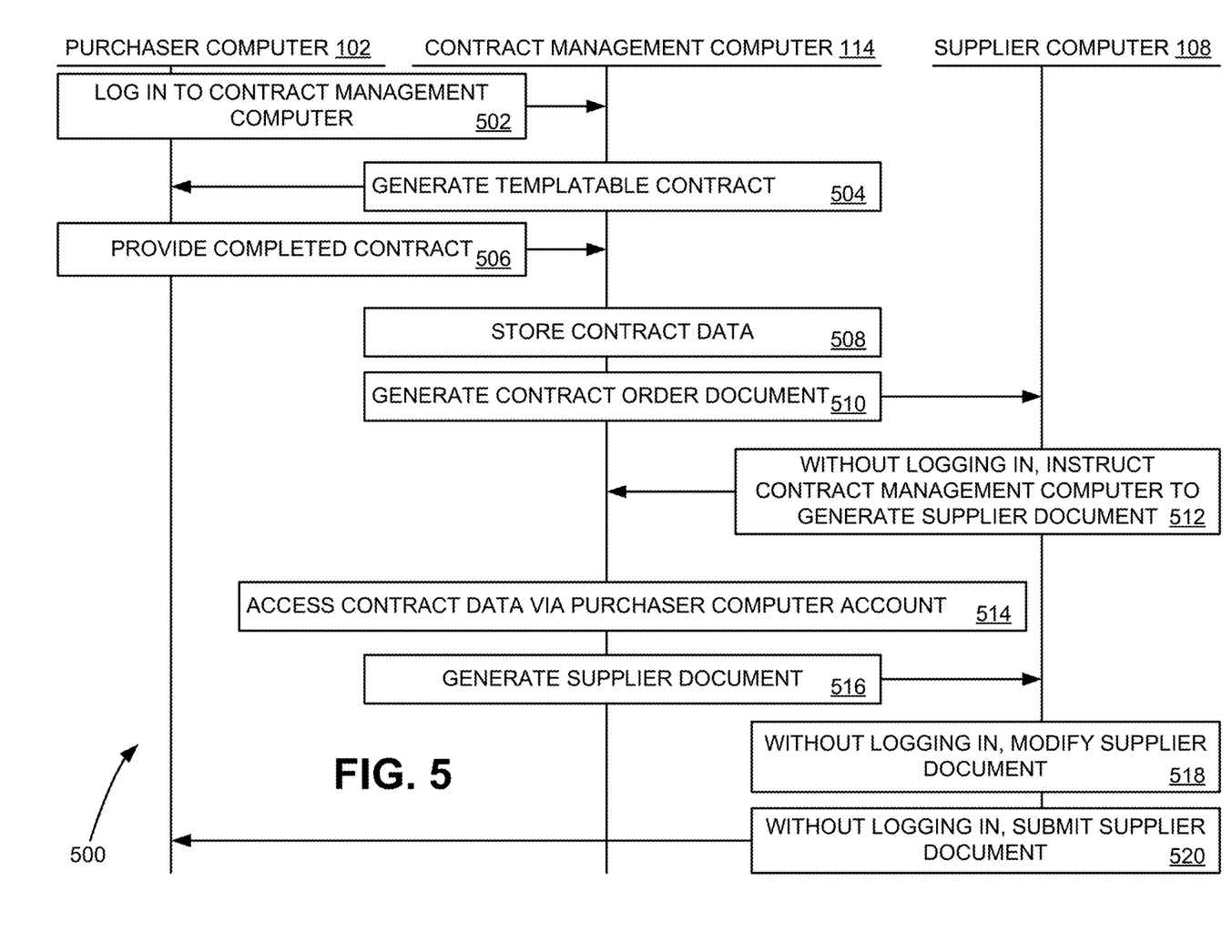
FIG. 5 depicts a multi-lane flowchart depicting a method for generating invoices from contracts, in one embodiment.

FIG. 5 is a multi-lane flowchart that illustrates a programmable algorithm or method for generating invoices from contracts, in one embodiment.

In one embodiment, the method 500 is programmed for use in the environment 100 of FIG. 1, and that environment is used in the following description for purposes of illustrating a clear example. However, other embodiments may use other computer systems or networked environments. The method 500 allows supplier entities, who may not have access to contract management software, to generate and submit supplier documents to purchasers in an efficient and accurate manner.

In an operation 502, the purchaser computer 102 logs in to the contract management computer 114. Once logged in, the contract management computer 114, in an operation 114, generates a templatable contract between the purchaser entity and the supplier entity. Using the templatable contract, the purchaser computer 102, in an operation 506, provides the completed contract, including the terms of the contract. Operations 502-506 may be performed using contract management software.

In an operation 508, the contract management computer 114 stores contract data identified from the contract and the contract terms. The contract data may include the parties to the contract, identification of goods or services to be provided, payments to be made for the goods or services, payment information, milestones, and the like. The contract data may be provided by the purchaser computer 102 or may be determined by the contract management computer 114 from the contract terms of the operation 506.

In an operation 510, the contract management computer 114 generates a Contract Order Document. The Contract Order Document is generated from the contract data stored in association with the account of the purchaser computer 102. The contents of the Contract Order Document include contract data such as the contract itself and/or one or more terms of the contract. The Contract Order Document is an electronic document that includes one or more selectable user interface elements that each correspond to a type of supplier document. Types of supplier documents include, for example, timesheets, invoices, shipping notifications, and the like. The type of supplier documents may be selected using the contract data and/or a heuristic model having the terms of the contract as input data. The contract management computer 114 sends the Contract Order Document to the supplier computer 108 via, for example, email, a messaging application, or a social media platform.

In an operation 512, the supplier computer 108, without logging into the contract management computer 114, instructs the contract management computer 114 to generate one or more supplier documents. The instruction may be generated and sent in response to the supplier computer 108 selecting one or more buttons included in the Contract Order Document. The instructions include the type of supplier document, an identifier associated with the contract, and other data. In some embodiments, the contract management computer may prompt the supplier computer 108 for information to be included in the supplier document. The instructions may comprise the information received from the supplier computer 108.

In an operation 514, in response to the instruction, the contract management computer 114 accesses contract data pertaining to the contract from contract data 122 that is associated with the account of the purchaser computer 102. The contract management computer 114 may user the accessed contract data may to pre-fill one or more fields in a supplier document form or template. In some instances, the contract management computer 114 may assign one or more rules to some of the fields that limit inputs that may be entered into the fillable fields based on the contract terms or on common knowledge. For example, an hours per day field may be limited to 24 hours.

In an operation 516, the contract management computer 114 generates the supplier document by, for example, filling in one or more fields in the supplier document form or template. The supplier document template may be selected by the purchaser computer 102, the contract management computer 114, or the supplier computer 108. The contract management computer 114 sends the supplier document to the supplier computer 108 via, for example, email, a messaging application, or a social media platform.

In an operation 518, without logging into the contract management computer 114, the supplier computer 108 receives the supplier document and may, optionally, modify the supplier document by adding, deleting, or changing one or more fields. The supplier computer 108 may receive an editable supplier document or may use a user interface provided by the contract management computer 114 to modify the supplier document. The user interface may be accessed via, for example, the browser 106.

In an operation 520, without logging into the contract management computer 114, the supplier computer 108 submits the supplier document too the purchaser computer 102. In some instances, the supplier computer 108 may submit the supplier document directly to the purchaser computer 102 via, for example, email. In other instances, the supplier computer 108 may use the contract management computer 114 to submit the supplier document to the purchaser computer 102.

5. IMPLEMENTATION EXAMPLE—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
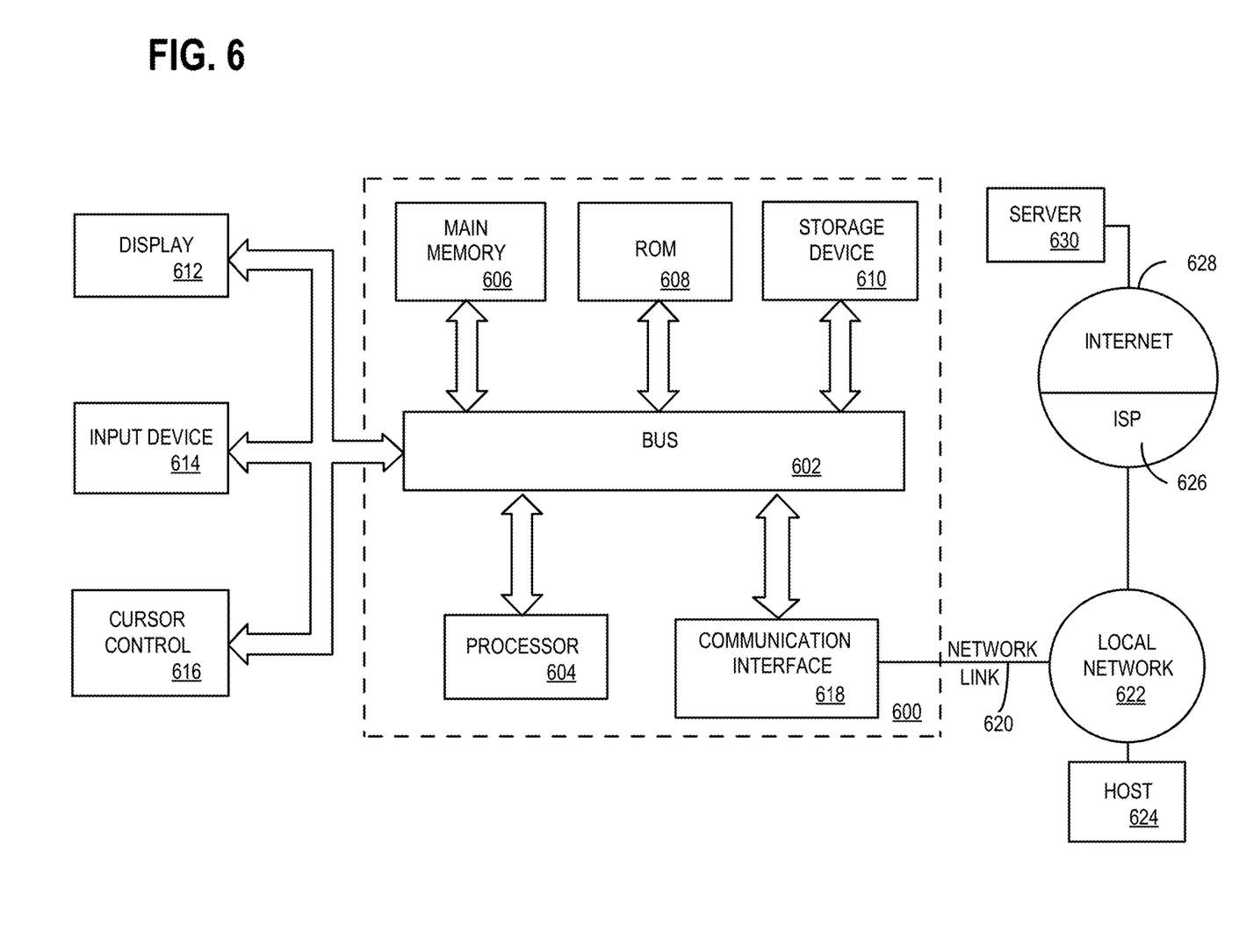
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An improved procurement system comprising:
 a memory having stored therein an account of a first entity, the account associated with a first computer and comprising contract data associated with a first entity and a contract terms included in a contract between the first entity and a second entity, wherein the second entity is not associated with the account;
 one or more processors;
 a non-transitory machine-readable medium having instructions stored thereon, the instructions executable by the one or more processors to perform:
 generating a Contract Order Document from the contract data associated with the first computer, the Contract Order Document being an electronic document comprising a portion of the contract data and a selectable user interface element that, when selected by a second computer associated with the second entity, generates an instruction to generate a first document;
 sending, via a network, the Contract Order Document to the second computer;
 receiving, in response to the Contract Order Document, the instruction from the second computer to generate the first document;
 obtaining, in response to the instruction and from the account of the first computer, at least a portion of the contract terms included in the contract between the first entity and the second entity;
 generating the first document using the at least the portion of the contract terms obtained from the account of the first computer;
 sending, via a network, the first document to the second computer.

2. The system of claim 1, wherein the non-transitory machine-readable medium having instructions stored thereon, the instructions executable by the one or more processors to further perform receiving log in information from the first computer associated with the first entity.

3. The system of claim 1, wherein the non-transitory machine-readable medium having instructions stored thereon, the instructions executable by the one or more processors to further perform generating the first document without receiving log in information from the second computer.

4. The system of claim 1, wherein the contract is generated as a templatable contract having one or more fillable fields for proving the contract terms.

5. The system of claim 1, wherein the first document comprises a time sheet, an invoice, a receipt, or a shipping notification.

6. The system of claim 1, wherein the non-transitory machine-readable medium having instructions stored thereon, the instructions executable by the one or more processors to further perform prompting the second computer to provide information as part of the instruction, and including the information in the first document.

7. The system of claim 1, wherein the first document is modifiable by the second computer.

8. The system of claim 1, wherein the non-transitory machine-readable medium having instructions stored thereon, the instructions executable by the one or more processors to further perform restricting modifications to the first document according to the contract terms.

9. The system of claim 1, wherein the non-transitory machine-readable medium having instructions stored thereon, the instructions executable by the one or more processors to further perform submitting the first document from the second computer to the first computer.

10. The system of claim 1, wherein the non-transitory machine-readable medium having instructions stored thereon, the instructions executable by the one or more processors to further performs sending the Contract Order Document via email, social media, or a messaging application.

11. An improved procurement method comprising:
storing in a memory, an account of a first entity, the account associated with a first computer and comprising contract data associated with a first entity and a contract terms included in a contract between the first entity and a second entity, wherein the second entity is not associated with the account;
using the first computer, generating a Contract Order Document from the contract data associated with the first computer, the Contract Order Document being an electronic document comprising a portion of the contract data and a selectable user interface element that, when selected by a second computer associated with the second entity, generates an instruction to generate a first document;
using the first computer, sending, via a network, the Contract Order Document to the second computer;
using the first computer, receiving, in response to the Contract Order Document, the instruction from the second computer to generate the first document;
using the first computer, obtaining, in response to the instruction and from the account of the first computer, at least a portion of the contract terms included in the contract between the first entity and the second entity;
using the first computer, generating the first document using the at least the portion of the contract terms obtained from the account of the first computer;
using the first computer, sending, via a network, the first document to the second computer.

12. The method of claim 11, further comprising receiving log in information from the first computer associated with the first entity.

13. The method of claim 11, further comprising generating the first document without receiving log in information from the second computer.

14. The method of claim 11, wherein the contract is generated as a templatable contract having one or more fillable fields for proving the contract terms.

15. The method of claim 11, wherein the first document comprises a time sheet, an invoice, a receipt, or a shipping notification.

16. The method of claim 11, further comprising prompting the second computer to provide information as part of the instruction, and including the information in the first document.

17. The method of claim 11, wherein the first document is modifiable by the second computer.

18. The method of claim 17, further comprising restricting modifications to the first document according to the contract terms.

19. The method of claim 11, further comprising submitting the first document from the second computer to the first computer.

20. The method of claim 11, further comprising sending the Contract Order Document via email, social media, or a messaging application.

* * * * *